(12) United States Patent
Wild et al.

(10) Patent No.: US 8,468,907 B2
(45) Date of Patent: Jun. 25, 2013

(54) SHIFT ARRANGEMENT

(75) Inventors: Benjamin Wild, Boxberg (DE); Tobias Lenz, Gemmrigheim (DE); Heiko Imholz, Fuerth (DE); Thomas Marx, Loechgau (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 224 days.

(21) Appl. No.: 12/967,529

(22) Filed: Dec. 14, 2010

(65) Prior Publication Data

US 2011/0138959 A1    Jun. 16, 2011

Related U.S. Application Data

(63) Continuation of application No. PCT/EP2009/002996, filed on Apr. 24, 2009.

(30) Foreign Application Priority Data

Jun. 25, 2008  (DE) .......................... 10 2008 031 815

(51) Int. Cl.
  *F16H 59/02*  (2006.01)
(52) U.S. Cl.
  USPC ........................................ 74/473.36; 74/335
(58) Field of Classification Search
  USPC ............. 74/473.36, 473.37, 335, 334, 473.19
  See application file for complete search history.

(56) References Cited

U.S. PATENT DOCUMENTS

| 1,432,902 | A | * | 10/1922 | Ragan .............................. 74/334 |
| 1,980,644 | A | * | 11/1934 | Vandervoort ............... 74/473.24 |
| 2,839,941 | A | * | 6/1958 | Rugen .............................. 74/359 |
| 3,513,717 | A | | 5/1970 | Lickey et al. |
| 3,929,029 | A | * | 12/1975 | Kelbel ......................... 74/473.21 |
| 4,449,416 | A | * | 5/1984 | Huitema ...................... 74/336 R |

(Continued)

FOREIGN PATENT DOCUMENTS

| DE | 43 42 957 A1 | 6/1995 |
| DE | 195 43 645 A1 | 5/1997 |

(Continued)

*Primary Examiner* — David M Fenstermacher
*Assistant Examiner* — Valentin Craciun
(74) *Attorney, Agent, or Firm* — Knobbe Martens Olson & Bear LLP

(57) ABSTRACT

A shift arrangement for a motor vehicle transmission has a multiplicity of gear stages. The shift arrangement has a shift shaft which is aligned in an axial direction and has a multiplicity of shift members which are designed to engage on shift sleeves which can be displaced axially in order to shift the gear stages. The shift shaft is mounted so as to be rotatable in order to select in each case one of the shift sleeves and so as to be axially displaceable in order to shift the gear stages. The shift members have in each case one driver device for coupling to the shift shaft. The shift shaft has a coupling arrangement which is designed to engage, depending on the rotational position of the shift shaft, in each case with a driver device of one of the shift members in order to couple that shift member axially to the shift shaft. The driver devices have in each case a multiplicity of at least three lugs which are aligned in the axial direction and which make it possible for the associated shift member and the shift shaft to be coupled to one another in a multiplicity of axial relative positions.

7 Claims, 6 Drawing Sheets

U.S. PATENT DOCUMENTS

| | | | | |
|---|---|---|---|---|
| 4,621,537 | A * | 11/1986 | Piazza et al. | 74/473.24 |
| 4,920,815 | A * | 5/1990 | Reynolds | 74/335 |
| 5,271,291 | A * | 12/1993 | Knape | 74/473.28 |
| 5,297,453 | A * | 3/1994 | Chene | 74/473.24 |
| 5,471,893 | A * | 12/1995 | Newbigging | 74/335 |
| 5,737,969 | A * | 4/1998 | Brown et al. | 74/473.25 |
| 5,743,147 | A * | 4/1998 | Gazyakan | 74/473.25 |
| 5,893,293 | A * | 4/1999 | Earp | 74/335 |
| 6,173,624 | B1 * | 1/2001 | Decker | 74/473.37 |
| 6,389,919 | B1 * | 5/2002 | Hennequet et al. | 74/473.37 |
| 6,691,590 | B1 * | 2/2004 | Patzner et al. | 74/473.24 |
| 6,845,685 | B2 * | 1/2005 | Brandwitte et al. | 74/473.25 |
| 7,444,896 | B2 * | 11/2008 | Schepperle | 74/335 |
| 7,461,567 | B2 * | 12/2008 | Ogami | 74/330 |
| 7,849,759 | B2 * | 12/2010 | Bader et al. | 74/473.21 |
| 8,028,600 | B2 * | 10/2011 | Kim et al. | 74/473.1 |
| 2002/0189383 | A1 * | 12/2002 | Schamscha | 74/340 |
| 2004/0177714 | A1 * | 9/2004 | Ronge | 74/473.37 |
| 2006/0230860 | A1 * | 10/2006 | Schepperle | 74/473.36 |
| 2006/0266141 | A1 * | 11/2006 | Ogami | 74/325 |
| 2011/0252920 | A1 * | 10/2011 | Bowen et al. | 74/665 F |

FOREIGN PATENT DOCUMENTS

| | | |
|---|---|---|
| DE | 100 45 266 A1 | 4/2002 |
| DE | 101 08 881 | 9/2002 |
| DE | 102 06 561 | 10/2002 |
| DE | 10 2004 006 807 | 9/2005 |
| DE | 10 2006 000247 A1 | 1/2007 |
| EP | 0 131 720 A | 1/1985 |
| EP | 1 538 372 A | 6/2005 |
| FR | 2 844 570 A | 3/2004 |
| WO | WO 03/040596 A | 5/2003 |

* cited by examiner

SHIFT ARRANGEMENT

CROSS REFERENCE TO RELATED APPLICATIONS

This is a Continuation application of International patent application PTC/EP 2009/002996, filed Apr. 24, 2009, which claims the priority of German patent application DE 10 2008 031 815, filed Jun. 25, 2008.

BACKGROUND OF THE INVENTION

The present invention relates to a shift arrangement for a motor vehicle transmission which has a multiplicity of gear stages, having a shift shaft which is aligned in an axial direction and having a multiplicity of shift members which are designed to engage on shift sleeves which can be displaced axially in order to shift the gear stages, with the shift shaft being mounted so as to be rotatable in order to select in each case one of the shift sleeves and so as to be axially displaceable in order to shift the gear stages, with the shift members having in each case one driver device for coupling to the shift shaft, with the shift shaft having a coupling arrangement which is designed to engage, depending on the rotational position of the shift shaft, in each case with a driver device of one of the shift members in order to couple that shift member axially to the shift shaft.

Document DE 10 2006 000 247 relates to a range shift actuator arrangement for double clutch transmissions. The actuator arrangement comprises a shift shaft which is rotated in order to select gear stages and is displaced axially (by means of a toothed rack) for shifting. Formed on the shift shaft is a coupling arrangement which has a coupling device with a multiplicity of three groove sections aligned with one another in the axial direction. Furthermore, in each case one driver device in the form of a lug is formed on the shift members, which driver devices are arranged so as to be distributed in the circumferential direction and are aligned with one another in the axial direction.

Said known actuator arrangement makes it possible for a gear to be shifted in one component transmission and for another gear to simultaneously be shifted in the other component transmission by means of the central shaft.

Document DE 10 2004 006 807 relates to a shift actuator arrangement having a shift shaft which is rotated for shifting, with the shift members being mounted on respective shift rails which are axially offset and which are selected by means of a lug on the shift shaft.

Similar actuator arrangements are also known from DE 101 08 881 and from DE 102 06 561. In the latter document, the simultaneous engagement of a plurality of gear stages of different component transmissions is possible. The gear stages can nevertheless be locked relative to one another.

BRIEF SUMMARY OF THE INVENTION

Against the above background, it is an object of the invention to specify an improved shift arrangement for motor vehicle transmissions, which in particular is simpler to produce and is suitable both for transmissions for longitudinal installation and also transmissions for transverse installation.

The above object is achieved by means of a shift arrangement for a motor vehicle transmission which has a multiplicity of gear stages, having a shift shaft which is aligned in an axial direction and having a multiplicity of shift members which are designed to engage on shift sleeves which can be displaced axially in order to shift the gear stages, with the shift shaft being mounted so as to be rotatable in order to select in each case one of the shift sleeves and so as to be axially displaceable in order to shift the gear stages, with the shift members having in each case one driver device for coupling to the shift shaft, with the shift shaft having a coupling arrangement which is designed to engage, depending on the rotational position of the shift shaft, in each case with a driver device of one of the shift members in order to couple that shift member axially to the shift shaft, and wherein the driver devices have in each case a multiplicity of at least three lugs which are aligned in the axial direction and which make it possible for the associated shift member and the shift shaft to be coupled to one another in a multiplicity of axial relative positions.

By means of said measure, it is possible firstly to realize a reduction in shift travel, specifically in particular when said measure is applied to double clutch transmissions. In such a double clutch transmission, if a gear stage is engaged in one component transmission, it is possible solely by rotating the shift shaft to subsequently realize coupling between the coupling arrangement and a driver device of another shift member. In other words, it is not necessary here for the shift shaft to be displaced axially, which leads to the reduction in shift travel mentioned above.

Furthermore, the driver devices have in each case a plurality of at least three lugs, such that the coupling arrangement, which is assigned to the shift shaft, may be formed for example with only one lug. This leads to a cost saving, because the formation of lugs or a multiplicity of lugs on the shift shaft is generally associated with relatively high costs.

Furthermore, the shift arrangement according to the invention can be used both for transmissions for longitudinal installation and also transmissions for transverse installation. In the case of transmissions for longitudinal installation, the shift members are generally all arranged offset with respect to one another in the axial direction, such that in this case the coupling arrangement has a multiplicity of axially offset coupling devices on the shift shaft. Here, the solution according to the invention leads to a particularly high cost saving. Modern transmissions for transverse installation generally have two parallel countershafts, such that some shift members may be aligned axially with one another. In said embodiment, the coupling arrangement can be of simpler design by virtue of the driver device being relocated in the axial direction towards the coupling device. Here, too, however, it is possible to obtain a cost saving since the driver devices on the shift forks can be realized more easily than the coupling arrangement on the shift shaft.

The shift arrangement according to the invention has an axially aligned shift shaft, such that the shift shaft can generally be aligned parallel to shafts of the vehicle transmission. Furthermore, the shift arrangement makes do with few components. This is because it is not necessary to provide a separate shift rod for each shift member.

Because the coupling arrangement can be coupled in each case only to one driver device of a shift member, the mounting of the shift members can be of simple configuration. During a shift process, dragging effects on the other shift members can be avoided. If appropriate, it is possible even to dispense with separate latching or locking of the shift members.

The coupling of the coupling arrangement to a driver device takes place generally only for the duration of a shift process, such that a supply of energy is generally also required only during said shift process (in order to axially move the associated shift member and the shift sleeve which is coupled to said shift member).

The shift members may be shift forks or shift rockers.

The present invention is preferably applied to multi-stage transmissions, in particular of spur gear type, such as for example automated shift transmissions or double clutch transmissions.

It is particularly preferable for the coupling arrangement to have a multiplicity of coupling devices, of which at least two are arranged so as to be distributed over the axial extent and over the circumference of the shift shaft. This aspect is also considered to be a separate invention independently of the feature regarding the multiplicity of lugs on the driver devices.

In said embodiment, the coupling arrangement is designed in particular for transmissions which are installed longitudinally in a vehicle.

Here, the individual coupling devices may in each case be realized in a structurally simple manner, for example in each case by means of one or two lugs which extend radially from the shift shaft. Accordingly, the cost outlay for the shift shaft can be reduced considerably.

In said embodiment, it is particularly advantageous for the coupling devices to be distributed over the circumference of the shift shaft in such a way that a circumferential gap is formed between at least two coupling devices.

Here, a circumferential gap of said type extends in the axial direction preferably across all the coupling devices.

The circumferential gap is preferably formed such that an axial displacement of the shift shaft is possible without one of the shift members thereby being driven in the axial direction. This free displaceability along the circumferential gap facilitates the teaching process of the sensor arrangement which is used.

Here, it is particularly advantageous for a parking lock coupling arrangement to be arranged in one circumferential gap, which parking lock coupling arrangement is designed to engage simultaneously with two driver devices.

In said embodiment, the circumferential gap or one of the circumferential gaps is utilized to realize a parking lock function. By means of the parking lock coupling arrangement, the shift shaft engages simultaneously with two driver devices, such that two gears can be engaged simultaneously (in the case of a double clutch transmission, in particular two gear stages of the same component transmission).

In an alternative embodiment, the coupling arrangement has a coupling device around which at least two driver devices are arranged so as to be distributed in the circumferential direction of the shift shaft.

Said embodiment is particularly suitable for transmissions which are installed transversely in a vehicle.

Here, it is particularly advantageous for the driver devices to be arranged so as to be distributed uniformly about the circumference of the shift shaft.

This can simplify the actuation of the shift shaft, in particular in the rotational direction.

Furthermore, in said embodiment, it is advantageous for a circumferential gap to be formed between at least two of the driver devices.

As a result of the circumferential gap, an axial displacement of the shift shaft is possible without one of the shift members thereby being driven in the axial direction. This free displaceability along the circumferential gap facilitates the teaching process of the sensor arrangement which is used.

In a further preferred embodiment, at least two shift members are arranged on axially opposite sides of one coupling device.

By means of this measure, it is possible overall to realize an axially compact shift arrangement.

It is also advantageous for the driver devices to be formed on axial webs which extend in the axial direction from the shift members.

Here, the axial webs may be formed as separate components which are connected to the shift members, for example by means of screwing, welding, etc.

It is however generally also conceivable for the axial webs to be formed in one piece with the shift members.

Furthermore, it is advantageous for a toothed rack section for axially displacing the shift shaft to be formed on a web section which is aligned axially with the coupling device.

By means of this measure, too, it is possible for the shift arrangement to be of particularly compact design in the axial direction.

Overall, it is particularly advantageous for the shift members to have in each case one mounting section by means of which the shift members can be mounted so as to be movable in each case in the axial direction, and for the mounting sections of at least two shift members to be mounted on a common mounting shaft so as to be axially offset with respect to one another.

Here, it is particularly preferable for the mounting sections of all the shift members to be mounted on a common mounting shaft so as to be offset axially.

In said embodiment, it is possible in particular to obtain a shift arrangement which is compact in the radial direction.

In particular in the case of a motor vehicle transmission for installation in the longitudinal direction, it is generally true in any case that the shift packs which can be actuated by means of the shift sleeves can be actuated in the axial direction. The axially offset mounting of the shift members on a common mounting shaft therefore leads to an optimization of installation space.

In the case of a motor vehicle transmission for installation in the transverse direction, it is preferable for the shift arrangement to have two mounting shafts which are arranged parallel to one another, with preferably at least two shift members being mounted in an axially displaceable manner on each mounting shaft.

This firstly leads to a reduction in structural expenditure, in particular if the shift members are in each case mounted in a freely displaceable manner on the respective mounting shaft. It is however alternatively also conceivable for the shift members to be fixed to the mounting shaft(s) in a latched fashion in certain positions. Here, it is particularly advantageous for the mounting shaft(s) to be aligned parallel to the shift shaft. This simplifies the design.

It is also advantageous for the mounting shaft(s) to be formed as a component which is separate from the shift shaft. This prevents dragging effects between the shift shaft and the shift members. Functional reliability can be improved.

Furthermore, the shift members can be latched in their respective positions (generally two shift positions and a neutral position situated in between) by means of a separate latching device. Because dragging effects are avoided, it is however also conceivable to dispense with a separate latching device, such that the latching takes place exclusively by means of the shift sleeve latching action which is generally present in any case in the shift packs. In other words, in said embodiment, the shift members are held in their respective positions in a latched fashion by means of the shift sleeves.

It is also preferable for the shift shaft and the bearing shaft(s) to be mounted at at least one of their ends on a common mounting component.

The shift arrangement can for example be pre-assembled and pre-adjusted in this way. Furthermore, the common bearing component makes it possible for the function to be independent of tolerances of the housing of the motor vehicle transmission.

In a further preferred embodiment, it is preferable for at least one of the shift members to be assigned a locking device which is designed to lock that shift member in the axial direction with respect to a housing (or a component fixed with respect to a housing) of the motor vehicle transmission as a function of the rotational position of the shift shaft.

Even though dragging effects are substantially eliminated when using (a) separate mounting shaft(s), such a locking device can offer additional security against unintended movements of shift members. It is for example possible for the simultaneous engagement of gear stages within one component transmission to be prevented in this way.

Furthermore, by means of such a locking device, it is possible for the position of a shift member which is not coupled to the shift shaft to be defined. In other words, it is possible in this case to dispense with a further latching means.

In an alternative embodiment, the shift shaft forms the mounting shaft. This embodiment is considered to be a separate invention independently of the embodiment of the driver devices.

In said embodiment, the mounting sections of the shift members are mounted on the shift shaft itself. This leads to a further optimization of installation space. However, dragging effects can arise here, such that a separate latching device and/or locking device is advantageous. It is however generally also conceivable, similarly to the situation with a separate mounting shaft, for latching to be realized exclusively by means of the latching devices (spring/block systems) of the shift packs.

Here, it is particularly advantageous for the coupling device which is assigned to the shift member to be a depression in the shift shaft, with the driver device of the shift member having a pin which is movable in the radial direction on the shift member and which, for axial coupling, engages into the depression and, in other rotational positions of the shift shaft, is offset in the radially outward direction. It is particularly advantageous here for the pin to engage, in the other rotational positions of the shift shaft, into a respective locking depression of the housing. In said embodiment, the locking device can be released in a structurally particularly expedient manner. Furthermore, a particularly compact design is obtained.

Here, it is particularly advantageous for the radially movably mounted pin to be preloaded inwards in the radial direction.

In this way, the pin, if it is aligned congruently with a depression of the shift shaft, is pressed into the depression and thereby provides axial coupling between the shift member and shift shaft.

In the embodiment in which the shift shaft forms the mounting shaft, it is possible by forming a corresponding number of depressions per coupling device to likewise realize a reduction in shift travel, in the same way as in the other embodiments mentioned above in which the driver device has a multiplicity of lugs.

It is also advantageous overall for the coupling devices to have in each case at least one lug section, with the lug sections projecting in each case in the radial direction with respect to the shift shaft.

Such a lug section may be realized in a comparatively simple manner for example by virtue of a corresponding component being fixed to a prepared straight shift shaft (for example by means of welding or by means of other measures).

Here, it is particularly advantageous for the driver devices to have in each case at least two groove sections into which an associated lug section of the coupling device can engage in order to axially couple the associated shift member and the shift shaft.

Alternatively or in addition to this, it is also possible for the coupling devices to have in each case at least one groove section.

Such a groove section may for example be formed by two lugs which project in the radial direction in relation to the shift shaft and which are axially offset. Such a groove section may however also be formed for example by means of a depression in the shift shaft.

Here, it is particularly advantageous for the driver devices to have in each case at least one lug section which can engage into an associated groove section of a coupling device in order to axially couple the associated shift member and the shift shaft.

In general, it is functionally unimportant as to whether the coupling devices have lugs or grooves (and the driver devices correspondingly have grooves or lugs). The respective selection is made in individual cases from production and/or dynamic aspects.

Overall, however, it is preferable for at least one lug section or one groove section to have a multiplicity of lugs or depressions (or grooves) which are aligned with respect to one another in the axial direction and which make it possible to couple the associated shift member and the shift shaft to one another in a multiplicity of axial relative positions.

By means of said measure, it is possible to realize a reduction in shift travel. This is of significance in particular when using the shift arrangement according to the invention in a double clutch transmission. In double clutch transmissions, it is possible in a known way for two gear stages to be engaged simultaneously, wherein the power flow runs generally via only one of the two gear stages. By means of overlapping actuation of input-side friction clutches, the power flow can be transferred, without an interruption in tractive force, from one engaged gear stage to the other engaged gear stage.

In the case of a plurality of lugs or depressions (grooves) which are aligned with one another in the axial direction being formed, it is for example possible for the shift shaft to initially be coupled axially to one shift member (of a first component transmission) and to move the latter in the axial direction. Subsequently, to select a further gear stage (of the second component transmission), it is necessary merely to rotate the shift shaft in order to couple another coupling device axially to the driver device of the further shift member and to subsequently displace the further shift member axially. Here, it is self-evident that the axial stroke of the shift rod is accordingly selected to be greater, such that the stroke corresponds to at least three axial shift positions, preferably at least five axial shift positions.

Furthermore, in each case a multiplicity of lugs or depressions (grooves) may be provided both on the coupling devices and also on the driver devices, which lugs or depressions (grooves) are aligned with respect to one another in the axial direction. In this way, it is for example possible for the functional range to be expanded without the shift shaft being excessively increased in size.

It is also self-evident that, in an arrangement of said type, not only single shifts but rather also multiple shifts are possible (for example a shift process from the second to the third or even into the 4th or 5th gear stage).

It is also preferable here for the shift path to be equal (or approximately equal) for all the shift clutch packs (synchronizing arrangements) of the motor vehicle transmission.

As a result of the reduction in shift travel, it is also possible to react more quickly to incorrect shifts or short term changes in the shift requirements.

It is self-evident that the features mentioned above and the features yet to be explained below can be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
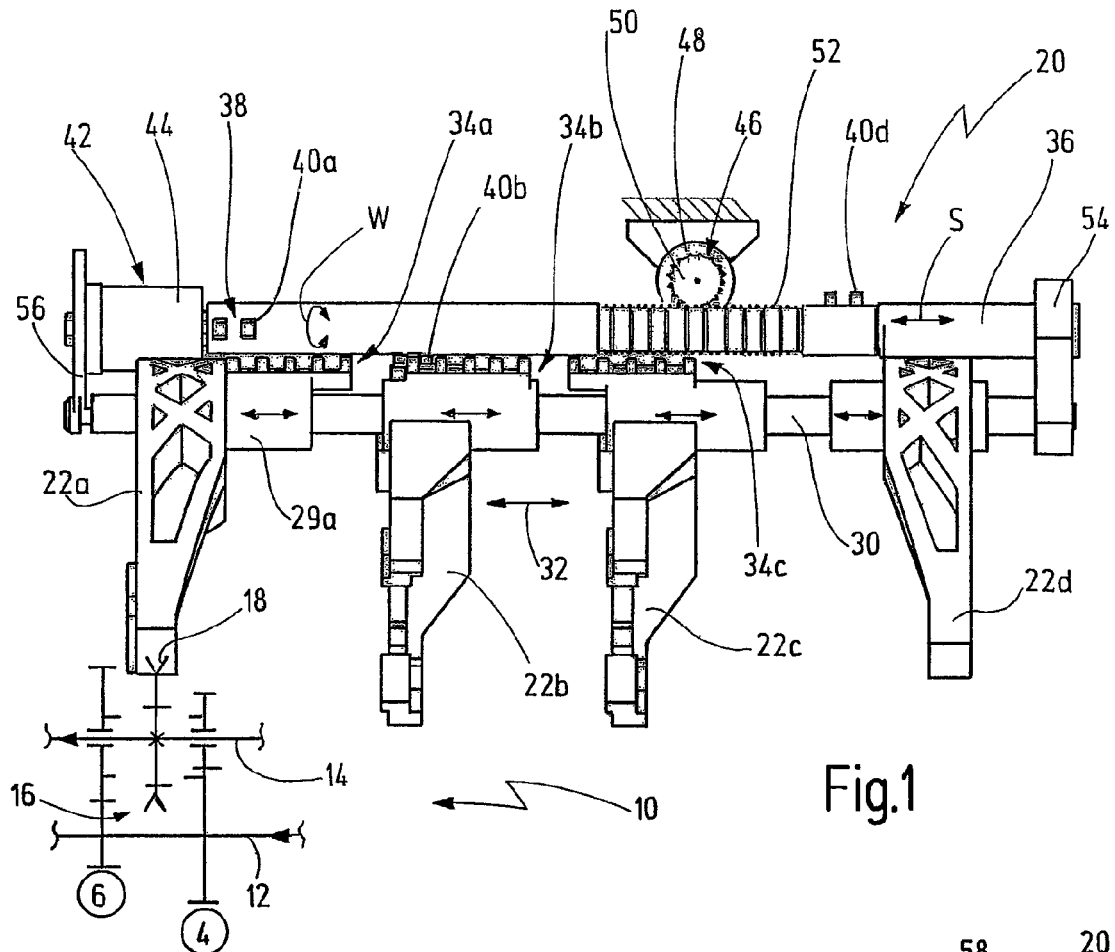
FIG. 1 shows a side view of a first embodiment of a shift arrangement according to the invention.

In FIG. 1, a motor vehicle transmission in the form of a countershaft-type multi-stage transmission is denoted generally by 10.

The motor vehicle transmission 10 is designed for longitudinal or in-line installation in a motor vehicle and has a first shaft 12 and a second shaft 14 parallel to said first shaft. Mounted on the shafts 12, 14 are wheel sets which are assigned to in each case one gear stage and which have a loose wheel and a fixed wheel. FIG. 1 illustrates, in schematic form, only the wheel sets for the gear stages 4 and 6 of the motor vehicle 10. It is self-evident that the motor vehicle transmission 10 may have five, six, seven or more forward gear stages (and also generally one reverse gear stage).

Arranged between the wheel sets for the gear stages 4 and 6 is a shift clutch pack 16. A shift sleeve 18 of the pack 16 is axially displaceable and is designed to connect either the loose wheel of the wheel set for the gear stage 6 or the loose wheel of the wheel set for the gear stage 4 in a positively locking fashion to the associated shaft (in this case the shaft 14). The shift sleeve 18 of the shift clutch pack 16 can be moved in the axial direction by means of a schematically indicated shift sleeve 18.

Correspondingly, the motor vehicle transmission 10 has wheel sets for the gear stages 2/R, 1/3 and 7/5, which are assigned in each case one corresponding shift clutch pack 16 (not shown in FIG. 1 in order to make the illustration clearer).

The motor vehicle transmission 10 is preferably a double clutch transmission with two component transmissions which, at the input side, are assigned in each case one separate friction clutch. One component transmission contains the even-numbered gear stages, and the other component transmission contains the odd-numbered gear stages. The reverse gear stage is assigned to one of the two component transmissions, in the present case to the component transmission with the even-numbered gear stages.

To actuate the shift sleeves 18 of the shift clutch packs 16 of the motor vehicle 10, a shift arrangement is provided which is denoted in FIG. 1 generally by 20.

The shift arrangement 20 has a multiplicity of shift forks 22 which are assigned to in each case to one of the shift sleeves 18. To distinguish between the shift forks 22, these are provided with the suffixes a, b, c, d.

The shift forks 22 have in each case one mounting section 29, by means of which the shift forks 22 are mounted on a common mounting shaft 30. The mounting shaft 30 extends in the axial direction 32 of the motor vehicle transmission 10, that is to say parallel to the shafts 12, 14. The shift forks 22 are mounted on the mounting shaft 30 so as to be distributed in the axial direction. Furthermore, the shift forks 22 can be displaced on the mounting shaft 30 in the axial direction, as indicated by corresponding arrows in FIG. 1.

The shift forks 22 have in each case one driver device 34. The driver devices 34 serve to displace the shift forks 22 in the axial direction 32 along the mounting shaft 30.

The shift arrangement 20 also has a shift shaft 36 which is formed separately from the mounting shaft 30 but is aligned parallel to the latter.

The shift shaft 36 has a coupling arrangement 38 which comprises a multiplicity of coupling devices 40 (with corresponding suffixes a, b, c, d). Each coupling device 40 is assigned a driver device 34 of a shift fork 22.

The coupling devices 40 are accordingly arranged on the shift shaft 36 so as to be distributed in the axial direction 32. Furthermore, the coupling devices 40 are arranged so as to be distributed about the shift shaft 36 in the circumferential direction.

In this way, depending on the rotational position of the shift shaft 36, in each case one coupling device 40 is coupled to the associated driver device 34. This is shown in FIG. 1 for the coupling device 40b and the associated driver device 34b of the shift fork 22b. The other driver devices 34a, c, d are decoupled from the shift shaft 36. Rotational movements of the shift shaft 36 are consequently selecting movements W. Correspondingly, axial movements of the shift shaft 36 are shift movements S, in which a coupling device 40 drives in each case one driver 34 in the axial direction and consequently displaces the associated shift fork 22 axially.

To rotate the shift shaft 36, a rotary drive 42 is provided. This may be a hydraulic drive, but in the present case is an electric motor 44. For shift movements S, a linear drive 46 is provided. This too may be of hydraulic design, but in the present case is formed by an electric motor 48 which is connected to a pinion 50 which engages with a toothed rack section 52 of the shift shaft 36.

The electric motor 44 may be arranged coaxially with respect to the shift shaft 36, but may also be arranged offset with respect to and parallel to said shift shaft 36 and drive the latter via a gear set. The electric motor 48 may, as illustrated, be arranged perpendicular to the extent of the shift shaft 36, though may also be arranged parallel thereto. In the latter case, the electric motor 48 could be connected to a toothed rack section of the shift shaft 36 by means of a bevel gearing.

The shift shaft 36 and the mounting shaft 30 are mounted in the region of their ends by means of a first mounting component 54 and a second mounting component 56. The shift shaft 36 may be mounted on the mounting component 56 indirectly via the rotary drive 42.

The shift arrangement 20 is designed as a range shift actuator arrangement and makes it possible to move in each case one shift fork 22 without influencing the other shift forks. Furthermore, the coupling devices 40 can be decoupled from the driver devices 34 in any axial position of the shift forks 22, such that after the engagement of a gear in one component transmission (first transmission range), a gear stage can additionally be engaged in the second component transmission (second transmission range). Contact between the shift shaft 36 and the shift forks 22, and therefore an undesired movement of non-coupled elements, is eliminated.

The shift forks 22 may be mounted on the mounting shaft 30 in an axially freely movable manner. The corresponding shift positions (neutral or first shift position (for example gear stage 6) and second shift position (for example gear stage 4)) may for example be defined in that the latching means (spring/block pack) generally provided in any case in the shift clutch pack 16 axially fixes the shift sleeve 18 and thereby also the shift member 22 which is in engagement therewith. Alternatively, it is self-evidently also possible to provide the engagement region between the shift forks 22 and the mounting shaft 30 with suitable latching means. In addition to this, it is generally not necessary to lock the shift forks 22 of a component transmission (in an automated shift transmission, of the entire transmission) with respect to one another. It is nevertheless possible for such a locking device to additionally be provided.

Figure 2:
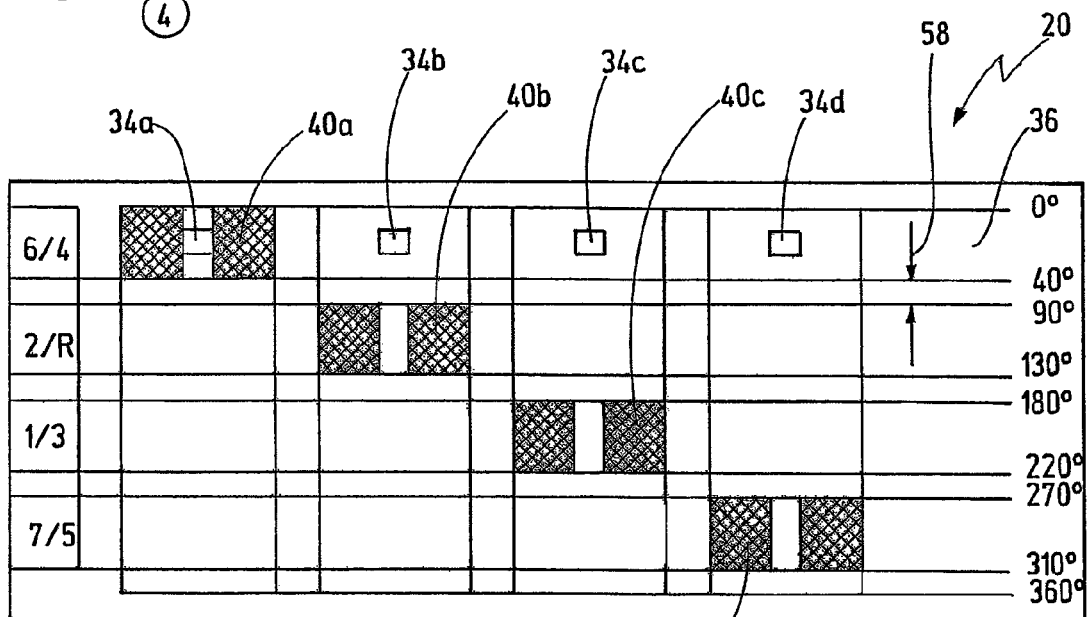
FIG. 2 shows a developed view of a shift shaft of a shift arrangement according to a further embodiment.

FIG. 2 shows a shift shaft of a further embodiment of a shift arrangement 20 in a developed view. The shift arrangement 20 generally corresponds in terms of design and function to the shift arrangement 20 of FIG. 1, wherein the driver devices have in each case only a single lug, such that a reduction in shift travel can be realized only to a limited extent. This may however also be realized by virtue of the lugs of the driver devices 34 engaging in each case axially from the outside on the respective coupling devices 40.

It can also be seen that the shift shaft has, in one circumferential section (0° to 40°, a first coupling device 40a which is composed of two projecting lugs between which a groove is formed. In a corresponding way, a coupling device 40b of identical design is arranged in a circumferential region from 90° to 130°, a third coupling device 40c is arranged in a circumferential region from 180° to 220°, and a fourth coupling device 40d is arranged in a circumferential region from 270° to 310°.

In the illustrated embodiment, the shift members 22 each have driver devices 34 in the form of an individual lug, which is dimensioned so as to fit into the groove between the two lugs of a coupling device 40. In the situation illustrated in FIG. 2, the driver device 34a is coupled to the coupling device 40a. The other drivers, in contrast, are decoupled from their associated coupling devices.

It can also be seen in FIG. 2 that the coupling devices 40 are distributed about the circumference of the shift shaft 36 such that in each case one circumferential gap 58 is formed between the coupling devices 40 (for example from 40° to 90°).

Said circumferential gap 58 is dimensioned such that, when the driver devices 34a are aligned with it, the shift shaft 36 can be moved freely in the axial direction without coming into engagement with any of the coupling devices 40. This free displaceability is advantageous for the teaching process of the sensor arrangement which is used. Furthermore, the corresponding circumferential gaps also have a positive effect on the required resolution of the selecting drive (the resolution need not be so high).

The following FIGS. 3 to 9 each show alternative embodiments of shift arrangements 20. Said shift arrangements 20 generally correspond in terms of design and function to the shift arrangements 20 of FIGS. 1 and/or 2. Therefore, only differences are explained below.

Figure 3:
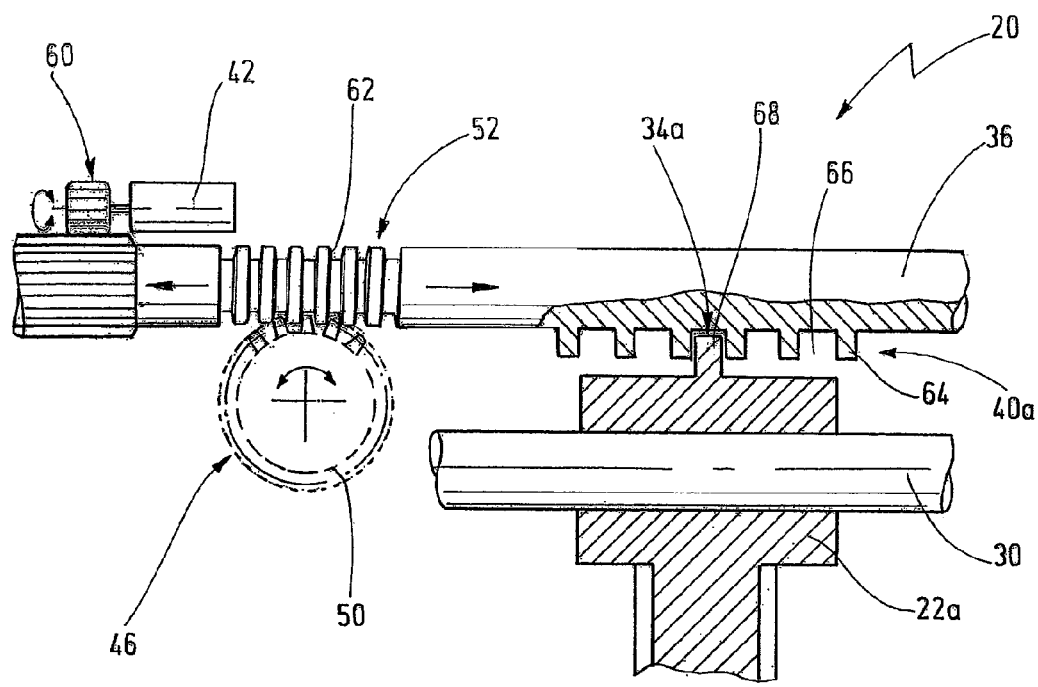
FIG. 3 shows a further alternative embodiment of a shift arrangement according to the invention.

FIG. 3 firstly shows that the rotary drive 42 may have an electric motor which is arranged parallel to and offset with respect to the shift shaft 36. The rotary drive 42 may be connected to the shift shaft 36 by means of a wheel set 60. The figure also shows that the toothed rack section 52 may have a multiplicity of encircling tooth grooves 62 into which the pinion 50 can engage regardless of the rotational position of the shift shaft 36.

Here, the wheel set 60 is preferably designed such that the wheel assigned to the shift shaft 36 is considerably wider than the wheel connected to the drive motor 42 (this is merely indicated in FIG. 3). In this way, it is possible for the shift shaft 36 to be displaced axially without the selecting drive 42 having to be moved concomitantly. Other types of end-side linear guides for the selecting drive 42 are also possible.

In the shift arrangement 20 of FIG. 3, each coupling device 40a has not only two lugs between which a groove is formed. In fact, the coupling devices 40 have in each case a multiplicity of lug sections 64 which are arranged offset with respect to one another in the axial direction and between which is formed in each case one groove section 66. Overall, in this embodiment, in each case five groove sections 66 are assigned to one coupling device 40. The driver device 34a of the shift member 22 has a single lug which can engage into each of the five groove sections 66. The groove sections 66 are spaced apart from one another correspondingly to the spacing of the shift positions to one another. In FIG. 3, the lug section 68 engages for example into the middle groove section 66. Assuming that this is the neutral position, then to displace the shift fork 22 into one of the shift positions, it is necessary for said shift fork 22 to be displaced in each case by a distance corresponding to the spacing between two adjacent groove sections 66.

By means of said design of the coupling devices 40, it is possible to realize a reduction in shift travel, as will be explained on the basis of FIG. 4.

Figure 4:
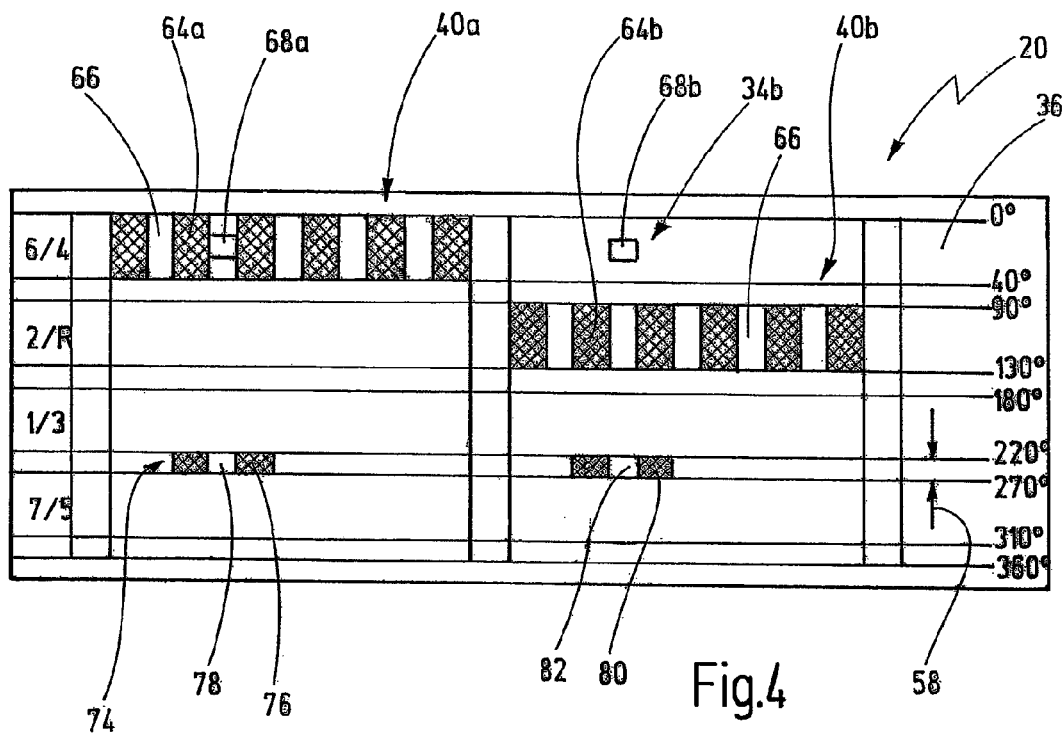
FIG. 4 shows a developed view of the shift shaft shown in FIG. 3.

The illustration of FIG. 4 is based for example on a shift process in which the shift shaft 36 has displaced the lug section 68a of the shift fork 22a by one groove spacing (corresponding for example to a movement from a neutral position into a first shift position). Proceeding from here, it is possible by means of purely a rotational movement of the shift shaft 36 to push another lug section (for example 68b) directly into one of the grooves 66 of the associated coupling device (for example 40b) without the need for the shift shaft 36 to be displaced axially in advance. Here, the use of five grooves 66 per coupling device 40 permits any desired combinations of selecting and shift processes of the shift arrangement 20.

FIG. 4 also shows a parking lock coupling arrangement 74. The parking lock coupling arrangement 74 has, in a circumferential gap 58, a first pair of parking lock lugs 76 which are arranged axially adjacent to one another and between which is formed a parking lock groove 78. In a corresponding way, the parking lock coupling arrangement 74 has, in the same circumferential gap 58, a second pair of parking lock lugs 80 between which is formed a parking lock groove 82. The parking lock grooves 78, 82 are spaced apart from one another axially correspondingly to the spacing of two lugs 68 to one another.

If the shift shaft 36 is rotated such that for example the lugs 68a, 68b engage simultaneously into the parking lock grooves 78, 82, it is possible for two gear stages assigned to the same component transmission (or in the case of the automated shift transmission, to the same transmission) to be engaged simultaneously, such that the transmission is blocked and a parking lock function is then realized.

Figure 5:
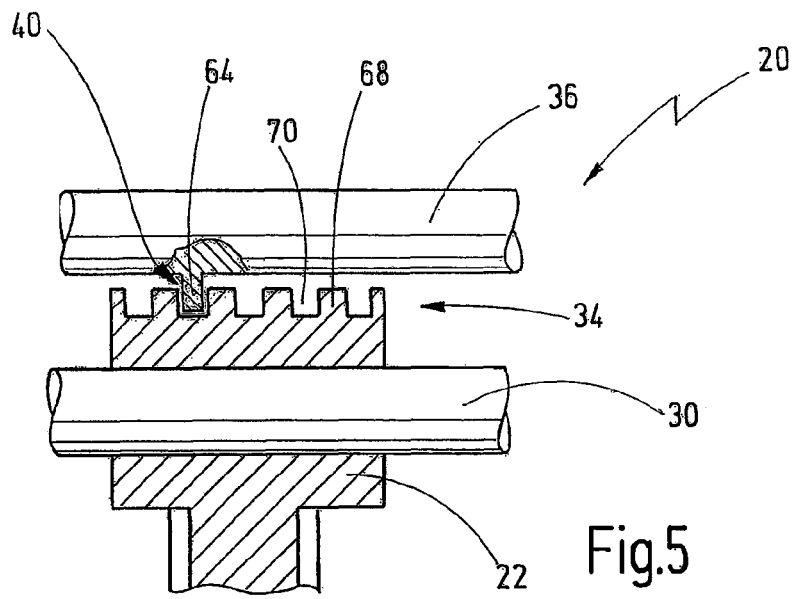
FIG. 5 shows a further alternative embodiment of a shift arrangement according to the invention.

FIG. 5 shows an alternative embodiment of a shift arrangement 20, in which the coupling devices 40 of the shift shaft 36 have in each case only a single lug section 64. In said embodiment, the driver devices 34 have in each case a multiplicity of lug sections 68 and grooves 70 formed in between. The illustration of FIG. 5 is otherwise functionally identical to the shift arrangement 20 of FIGS. 3 and 4.

Figure 6:
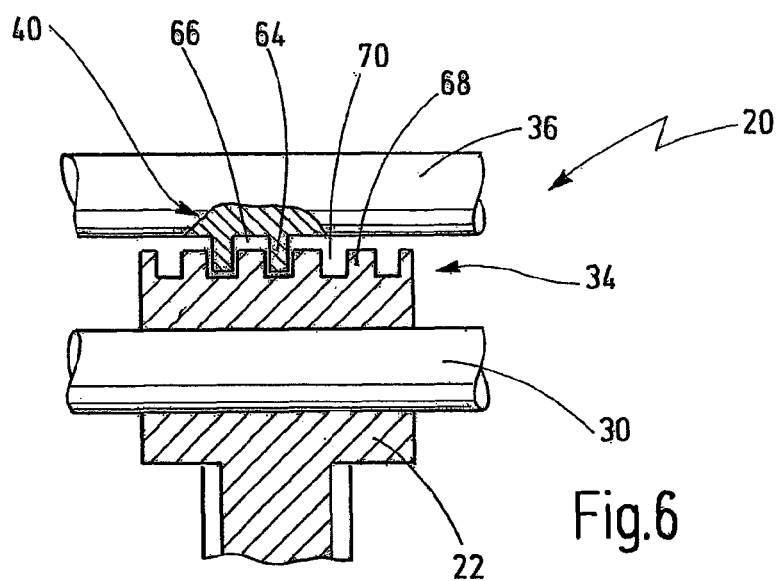
FIG. 6 shows a further alternative embodiment of a shift arrangement according to the invention.

FIG. 6 shows a further alternative embodiment in which the driver devices 34 are in each case of the same design as in FIG. 5. The coupling devices 40, however, have in each case two lug sections 64 between which is formed a groove section 66. In said embodiment, it is also conceivable for only three grooves 70 to be provided in the driver device 34 instead of five grooves 70. Here, it is possible to obtain the same functional range as in the shift arrangement 20 of FIGS. 3 and 4. Furthermore, the illustration of FIG. 6 corresponds to the driver and coupling devices 34, 40 shown in FIG. 1.

Figure 7:
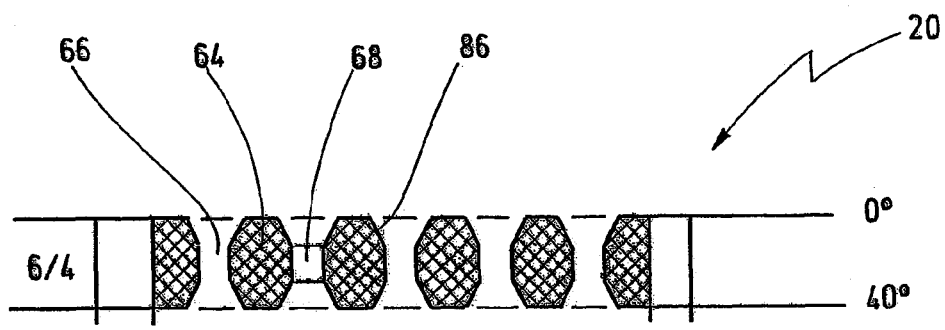
FIG. 7 shows a detail from a developed view of a shift shaft of a shift arrangement according to the invention.

FIG. 7 illustrates that the lug sections 64 (or the lug sections 68) may each be formed with insertion bevels 86 in order to permit easier insertion of lug sections 68 (or 64).

Figure 8:
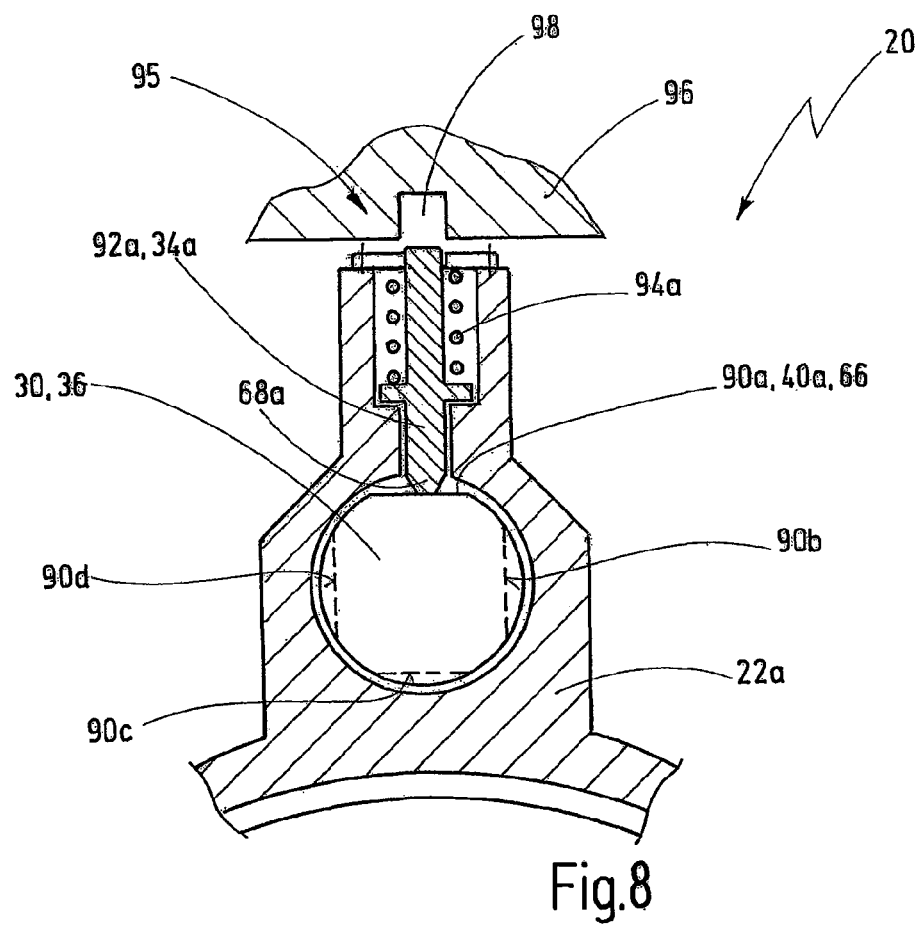
FIG. 8 shows a schematic cross-sectional view of a further embodiment of a shift arrangement according to the invention.
Figure 9:
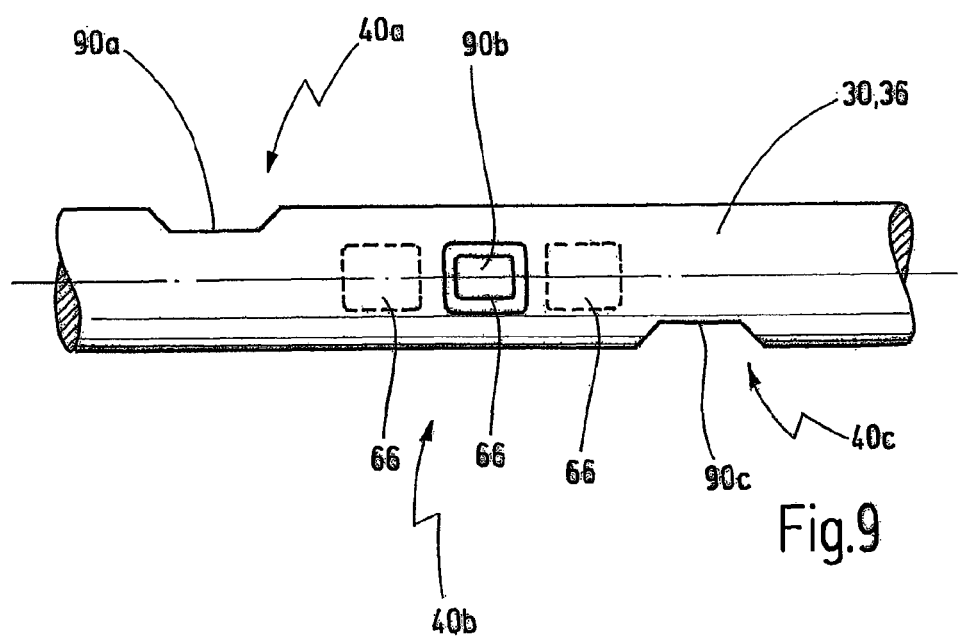
FIG. 9 shows a side view of the shift shaft of the shift arrangement of FIG. 8.
Figure 10:
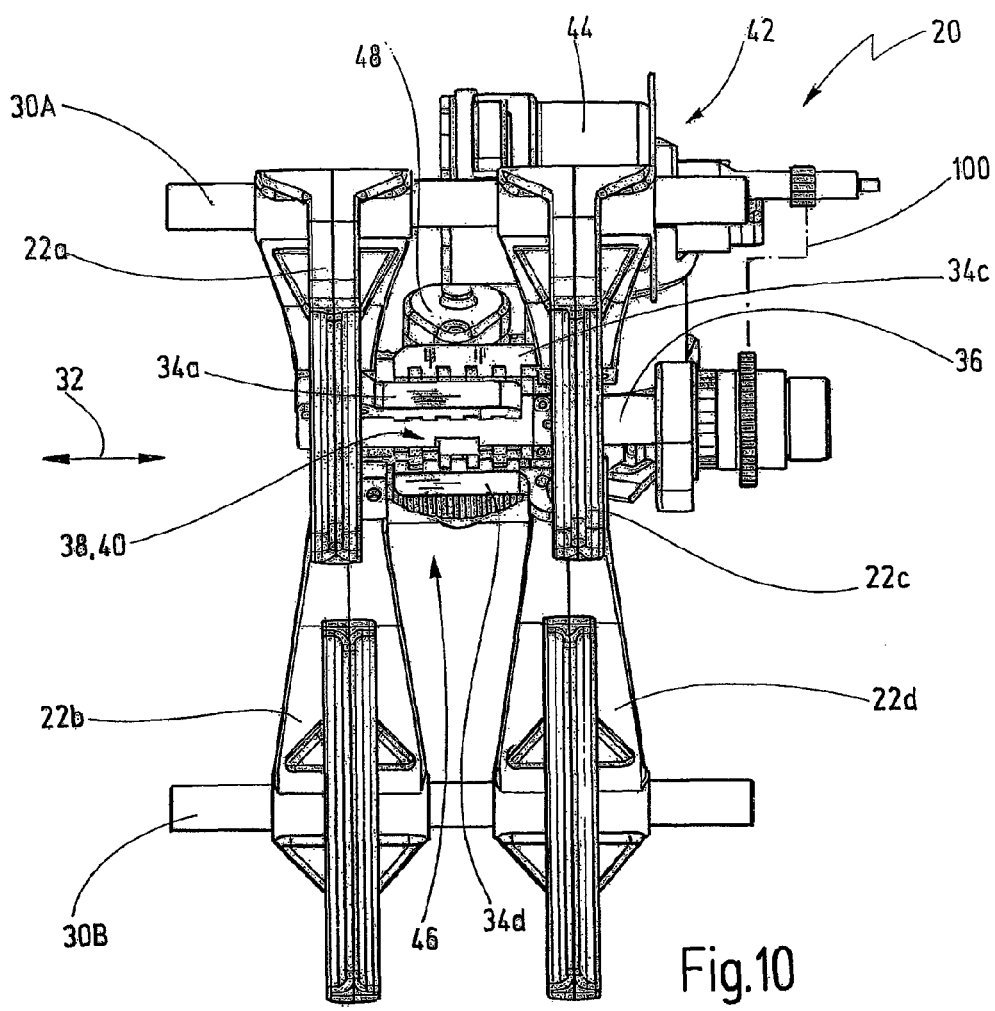
FIG. 10 shows a side view of a further alternative embodiment of a shift arrangement according to the invention.

FIGS. 8 and 9 illustrate a further alternative embodiment of a shift arrangement 20.

In the shift arrangement 20, the shift shaft 36 simultaneously forms the mounting shaft 30. In other words, the shift forks 22 are in each case mounted directly on the shift shaft 36. The coupling devices 40 are formed in each case by depressions 90 in the shift shaft 36. The driver devices 34 are formed in each case by pins 92 which are mounted on the shift forks 22 so as to be movable in the radial direction. More precisely, the pins 92 are preloaded in the radial direction towards the shift shaft 36 by means of a respective spring 94.

Depending on the rotational position of the shift shaft 36, in each case one pin 92 engages into an associated depression 90. The pin 92 may also be part of a locking device 95. FIG. 8 illustrates a housing 96 of the motor vehicle transmission (or some other section fixedly connected thereto). Formed thereon is a locking depression 98 into which a radially outer end of the pin 92 can engage, specifically when the pin 92 is forced out of its associated depression 90 counter to the force of the spring 94. That is to say, when the associated shift fork 22 is not selected, the shift fork 22 is locked with respect to the housing 96.

The shift arrangement 20 is compact overall and may be provided as a preassemblable unit. Assembly may also take place in a modular fashion depending on the wheel set configuration.

The shift arrangement 20 of FIGS. 8 and 9 may otherwise be identical in terms of function and design to the shift arrangements described above.

Furthermore, FIG. 9 shows that, instead of one depression 90 per coupling device 40, it is also possible for a multiplicity of depressions 66 to be provided on the shift shaft 36. This is schematically indicated in FIG. 9 for the coupling device 40b. For this situation, it is likewise possible to realize a reduction in shift travel, as is also the case in the embodiments mentioned above. In the same way, it is possible for a driver device to be assigned not one pin 92 but rather a multiplicity of pins 92, which are arranged offset axially with respect to one another, in order to realize a corresponding functional range.

FIGS. 10 to 13 show a further alternative embodiment of a shift arrangement 20 according to the present invention.

The shift arrangement 20 is designed in particular for use in motor vehicle transmissions which are installed transversely in the motor vehicle.

The basic mode of operation and the basic design of the shift arrangement 20 of FIGS. 10 to 13 correspond to those of FIGS. 1 to 9. Identical elements are therefore denoted by the same reference numerals. Only differences will be explained below.

The shift arrangement 20 has a central shift shaft 36 which is displaced axially (axial direction 32) for shifting and is rotated for selecting. Furthermore, the shift arrangement 20 has a rotary drive (selecting drive) 42 with an electric motor 44 which is aligned axially parallel to the shift shaft 36. By means of a schematically indicated rotary drive gearing 100, an output shaft of the electric motor 44 is coupled in terms of drive to the shift shaft 36. Furthermore, the shift arrangement 20 has a linear drive 46 which comprises an electric motor 48. The electric motor 48 is arranged in a direction perpendicular to the axial direction 32.

The shift members 22 of the shift arrangement 20 are mounted not on a single mounting shaft but rather on two mutually parallel mounting shafts 30A, 30B. More precisely, shift members 22a, 22c are mounted in an axially freely displaceable manner on the first mounting shaft 30A. The shift members 22b, 22d are mounted in an axially freely displaceable manner on the second mounting shaft 30B.

Provided on the shift shaft 36 is a coupling arrangement 38 in the form of a single coupling device 40. The coupling device 40 has two lugs and a groove situated in between. The shift member 22a and the shift member 22c are arranged on axially opposite sides of the coupling device 40. In the same way, the shift members 22b, 22d are arranged on axially opposite sides of the coupling device 40.

Each of the shift members 22 is assigned a driver device 34, which driver devices 34 have in each case one axial web which extends axially from the shift member 22. Arranged on the axial web are a multiplicity of lugs and grooves situated in between. The general coupling between the coupling device 40 and the driver devices 34 corresponds to the design of FIG. 6 above. In the same way, the coupling device 40 may however also have only a single lug (as in FIG. 5).

Figure 11:
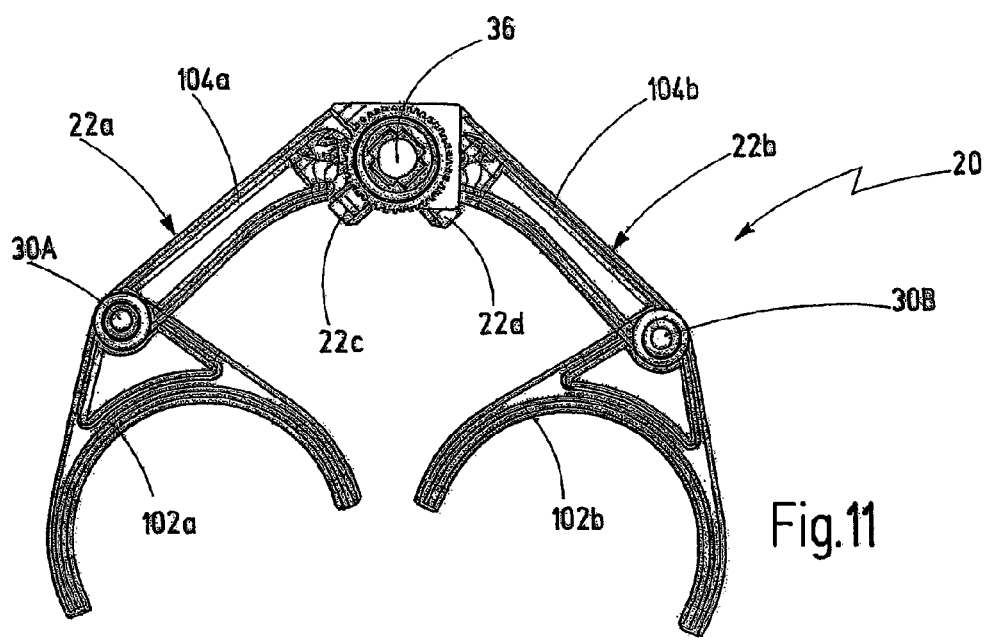
FIG. 11 shows a partial view of the shift arrangement of FIG. 10 in the axial direction.

As shown in FIG. 11, each shift member 22 has a fork component 102 which engages into a respective shift sleeve of a shift clutch pack 16. The fork component 102 is mounted in each case in an axially freely displaceable manner on the associated mounting shaft 30A, 30B. Furthermore, an arm component 104 is rigidly connected to the respective fork component 102. The arm components 104 extend from the mounting shafts 30A, 30B in each case towards the central shift shaft 36. The abovementioned axial webs are fixed to the arm components 104.

The driver devices 34 of the shift members 22 are arranged so as to be distributed about the coupling device 40 in the circumferential direction of the shift shaft 36.

Figure 12:
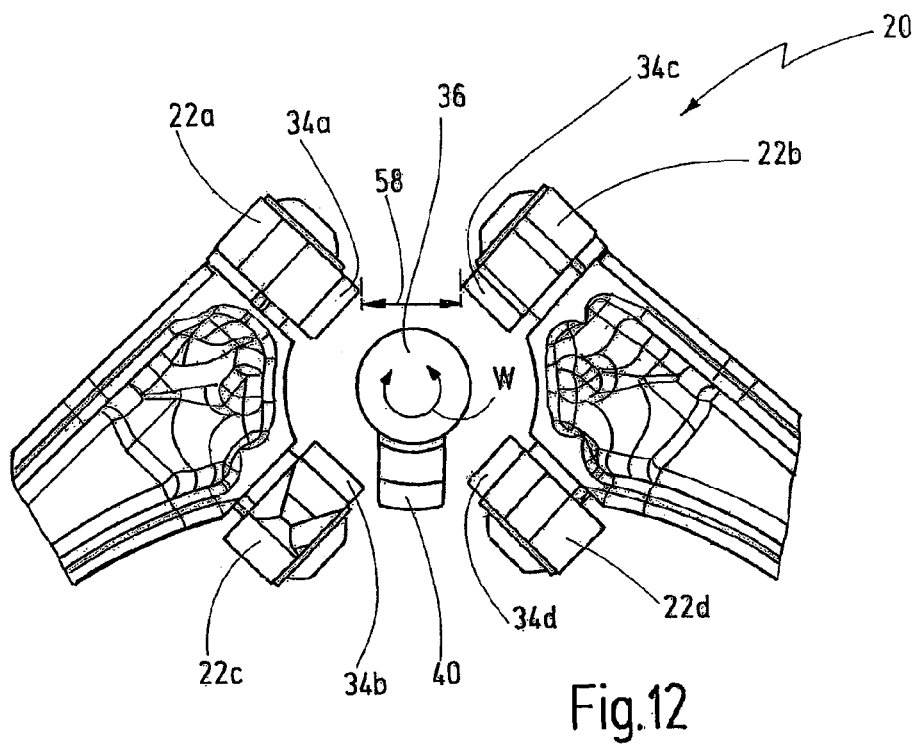
FIG. 12 shows a detail of the shift device of FIGS. 10 and 11, showing driver devices and a single coupling device.

As shown in FIG. 12, the driver devices 34 are preferably arranged so as to be distributed uniformly about the circumference of the shift shaft 36. Here, the driver devices 34 are spaced apart from one another in the circumferential direction by a circumferential gap 58, the general function of which corresponds to that of the circumferential gap 58 of FIGS. 2, 4. In particular, the coupling device 40 is designed to be narrower than the circumferential gap 58, such that the coupling device 40 is axially freely movable between two driver devices (driver devices 34b, 34d in FIG. 12).

Figure 13:
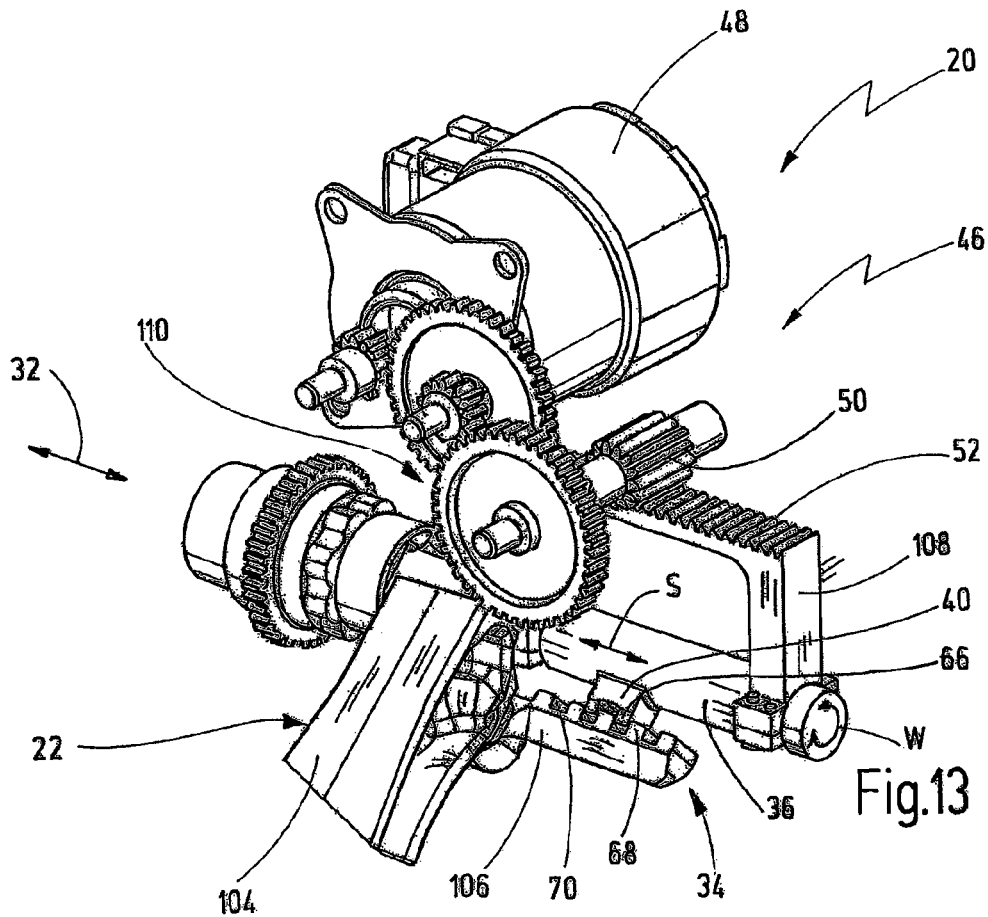
FIG. 13 shows a perspective partial view of the shift arrangement of FIGS. 10 to 12.

FIG. 13 shows that the linear drive 46 has a web component 108 which extends in the manner of a bridge over the coupling device 40. The shift shaft 36 is rotatably mounted on bridge pillars of the web component 108. Furthermore, the web component 108 is coupled to the shift shaft 36 in the axial direction.

Radially at the outside, the web component 108 has a toothed rack section 52 on which a pinion 50 engages. The pinion 50 is coupled by means of a linear drive gearing 110 to an output shaft of the electric motor 48 of the linear drive 46.

FIG. 13 also illustrates by way of example a driver device 34 which is formed on an axial web 106. The axial web 106 is rigidly connected to the arm component 104 of the shift member (of the shift fork) 22.

The axial web 106 has, on the side pointing radially towards the shift shaft 36, a multiplicity of lugs 68 which are axially spaced apart from one another and between which are formed grooves 70. In a corresponding rotational position of the shift shaft 36, the lugs 66 of the coupling device engage, as shown in FIG. 13, into the grooves 70 of the axial web 106 such that the shift fork 22 is coupled axially to the shift shaft 36.

The axial webs 106 of the shift forks 22 are aligned axially with one another and are provided around the shift shaft 36 such that, depending on the rotational position, the coupling device 40 can engage with one of the driver devices 34 of the shift forks 22.

What is claimed is:

1. Shift arrangement for a motor vehicle transmission which has a multiplicity of gear stages, having a shift shaft which is aligned in an axial direction and having a multiplicity of shift members which are designed to engage on shift sleeves which can be displaced axially in order to shift the gear stages, with the shift shaft being mounted so as to be rotatable in order to select in each case one of the shift sleeves and so as to be axially displaceable in order to shift the gear stages, with the shift members having in each case one driver device for coupling to the shift shaft, with the shift shaft having a coupling arrangement which is designed to engage, depending on the rotational position of the shift shaft, in each case with the driver device of one of the shift members in order to couple that shift member axially to the shift shaft,
wherein the driver devices have in each case a multiplicity of at least three lugs which are aligned in the axial direction and which make it possible for the associated shift member and the shift shaft to be coupled to one another in a multiplicity of axial relative positions, wherein the coupling arrangement has a multiplicity of coupling devices, of which at least two are arranged so as to be distributed over the axial extent and over the circumference of the shift shaft, wherein the coupling devices are distributed over the circumference of the shift shaft in such a way that a circumferential gap is formed between at least two coupling devices, wherein a parking lock coupling arrangement is arranged in one circumferential gap, which parking lock coupling arrangement is designed to engage simultaneously with two driver devices.

2. Shift arrangement according to claim 1, wherein the shift members have in each case one mounting section by means of which the shift members can be mounted so as to be movable in each case in the axial direction, and with the mounting sections of at least two shift members being mounted on a common mounting shaft so as to be offset axially with respect to one another.

3. Shift arrangement according to claim 2, wherein the shift members are mounted on the mounting shaft so as to be freely movable in the axial direction.

4. Shift arrangement according to claim 2, wherein the shift shaft and the mounting shaft are mounted at least one of their ends on a common mounting component.

5. Shift arrangement for a motor vehicle transmission which has a multiplicity of gear stages, having a shift shaft which is aligned in an axial direction and having a multiplicity of shift members which are designed to engage on shift sleeves which can be displaced axially in order to shift the gear stages, with the shift shaft being mounted so as to be rotatable in order to select in each case one of the shift sleeves and so as to be axially displaceable in order to shift the gear stages, with the shift members having in each case one driver device for coupling to the shift shaft, with the shift shaft having a coupling arrangement which is designed to engage, depending on the rotational position of the shift shaft, in each case with the driver device of one of the shift members in order to couple that shift member axially to the shift shaft,
wherein the coupling arrangement has a multiplicity of coupling devices, of which at least two are arranged so as to be distributed over the axial extent and over the circumference of the shift shaft, wherein the coupling devices are distributed over the circumference of the shift shaft in such a way that a circumferential gap is formed between at least two coupling devices, wherein a parking lock coupling arrangement is arranged in one circumferential gap, which parking lock coupling arrangement is designed to engage simultaneously with two driver devices.

6. Shift arrangement according to claim 5, wherein the shift members have in each case one mounting section by means of which the shift members can be mounted so as to be movable in each case in the axial direction, and with the mounting sections of at least two shift members being mounted on a common mounting shaft so as to be offset axially with respect to one another.

7. Shift arrangement according to claim 6, wherein the shift members are mounted on the mounting shaft so as to be freely movable in the axial direction.

* * * * *